(12) United States Patent
Taylor

(10) Patent No.: US 10,435,902 B2
(45) Date of Patent: Oct. 8, 2019

(54) PORTABLE POOL FILTER SYSTEM

(71) Applicant: Leonard Ray Taylor, Lafayette, IN (US)

(72) Inventor: Leonard Ray Taylor, Lafayette, IN (US)

(*) Notice: Subject to any disclaimer, the term of this patent is extended or adjusted under 35 U.S.C. 154(b) by 0 days.

(21) Appl. No.: 15/967,977

(22) Filed: May 1, 2018

(65) Prior Publication Data
US 2019/0112828 A1 Apr. 18, 2019

Related U.S. Application Data

(60) Provisional application No. 62/571,877, filed on Oct. 13, 2017.

(51) Int. Cl.
| | | |
|---|---|---|
| *E04H 4/16* | (2006.01) | |
| *B01D 24/12* | (2006.01) | |
| *B01D 36/02* | (2006.01) | |
| *B01D 35/26* | (2006.01) | |
| *C02F 1/00* | (2006.01) | |
| *E04H 4/12* | (2006.01) | |
| *B01D 29/27* | (2006.01) | |
| *C02F 101/20* | (2006.01) | |
| *C02F 103/42* | (2006.01) | |
| *C02F 101/32* | (2006.01) | |

(52) U.S. Cl.
CPC .............. *E04H 4/16* (2013.01); *B01D 24/12* (2013.01); *B01D 29/27* (2013.01); *B01D 35/26* (2013.01); *B01D 36/02* (2013.01); *C02F 1/004* (2013.01); *E04H 4/1209* (2013.01); *C02F 2101/203* (2013.01); *C02F 2101/32* (2013.01); *C02F 2103/42* (2013.01)

(58) Field of Classification Search
CPC ........ E04H 4/16; C02F 1/004; C02F 2101/32; C02F 2103/42; C02F 2101/203; B01D 36/02; B01D 24/12; B01D 35/26
USPC ........ 210/167.1, 167.12, 167.13, 282, 416.1, 210/416.2, 473, 474
See application file for complete search history.

(56) References Cited

U.S. PATENT DOCUMENTS

| | | | |
|---|---|---|---|
| 4,749,477 A | | 6/1988 | McGregor |
| 4,994,177 A | | 2/1991 | Bogar, Jr. |
| 5,702,607 A | * | 12/1997 | Lawson ................. B01D 29/27 134/111 |
| 6,241,877 B1 | * | 6/2001 | Berkey ................. B01D 24/008 210/97 |
| 6,666,286 B2 | * | 12/2003 | Yamashita ......... B23Q 11/0057 175/209 |
| 2011/0247970 A1 | | 10/2011 | Evingham |
| 2016/0067640 A1 | | 3/2016 | Jackson |
| 2017/0175369 A1 | * | 6/2017 | Hanson ................. B01D 29/13 |
| 2017/0321441 A1 | | 11/2017 | Laydera-Collins |

OTHER PUBLICATIONS

"Fixing Brown Rusty Water (Excess Iron) in Swimming Pool Water", pp. 4 of internet forum found at https://www.finishing.com/149/95.shtml.

* cited by examiner

*Primary Examiner* — Fred Prince
(74) *Attorney, Agent, or Firm* — D'Hue Law LLC; Cedric A. D'Hue

(57) ABSTRACT

A portable pool filter system is disclosed. The portable pool filter system is fully immersible and self-contained. Water is suction fed through the filter before entering the pump and being discharged. The device decontaminates water from all contaminations to include algae, iron, red clay, and oils.

3 Claims, 4 Drawing Sheets

PORTABLE POOL FILTER SYSTEM

CROSS-REFERENCE TO RELATED APPLICATIONS

This application is a U.S. Non-provisional patent application of and claims the priority of U.S. provisional patent application, Ser. No. 62/571,877 filed on Oct. 13, 2017, and incorporates the subject matter thereof in its entirety.

FIELD

The present invention is used to filter excessive levels of contaminants and particles out of water (pools, hot tubs, spas).

BACKGROUND

U.S. Pat. No. 4,994,177 A discloses a bait well water spray aerator with vast filtering capacity. The device is bucket-type shaped container 18 including a thick panel 60 of water filtering material. The panel 60 is flexed into a generally cylindrical configuration with abutting circumferential end edges 62 such that the panel 60 may be snugly telescoped within the container 18 against the inner surface portions of the side wall 20 disposed about the water inlet openings 54. The container 18 is provided for disposition within a reservoir containing water and bait. An electric motor powered submersible pump is wholly contained within the container and includes an inlet within the container and an outlet conduit which extends outwardly of the container and includes an outlet end within the associated receptacle above the water level therein and equipped with water sprayed discharge structure for discharging jets of water therefrom downwardly onto the surface of the water within the receptacle exteriorly of the container. The device to provide a water aeration apparatus for use in conjunction with a bait well and including vast water filtering capacity to eliminate the need for periodically having to clean a water filter. The '177 is silent regarding what is removed from the water.

US Patent Application Publication No. 20160067640A1 discloses a precision pool cleaner, the device may include a swimming pool filter made to clean pool water including of one submersible pump with flexible tubing, a reducing coupling and a container filled with polyfiber with holes drilled in the bottom. The device is then placed in water and causing the water to be filtered thru the pump and pushed thru the drum out the bottom causing the water to be clean and blue. The '640 is silent regarding the composition or identity of the filtered contaminants to produce water that is clean and blue.

US Patent Application Publication No. 20110247970A1 discloses a portable pump and filter assembly for use in pools, spas and open bodies of water. The device is a portable submersible pump and filter assembly for direct filtration of a body of water without the need for intake or discharge hoses or assemblies. Other than removal of leaves and debris, the '970 is silent regarding the composition of dirty water, clean water, and filtered water.

US Patent Application Publication No. 20170321441A1 discloses a bottom of pool cleaning device. The device operates by creating a high speed water jet curtain using an external source of energy by means of pressurized water, which impinges on an steady body of water transforming the energy provided by the external water source into a strong flow capable of lifting and conveying light and heavy debris from the floor of bodies of water and forcing these debris into a fine mesh filter for retention and later disposal. The '441 discloses filtering large and small debris comprising sand, mud, rocks, dead algae, and the like.

U.S. Pat. No. 4,749,477 A discloses a portable swimming pool filter. A filter includes a portable housing having upper and lower parts. A pump is mounted on the upper part. The lower part contains a filter unit operatively connected to the delivery of the pump, has an inlet opening for the pump suction, and is immersible in a body of liquid requiring filtration. Advantageously the upper part contains a drive motor for the pump and has mounting means for mounting on the edge of a swimming pool. The '477 is silent regarding the identity or composition of the filtered components.

A public internet forum has archived a range of posts for "Excessive Iron in Swimming Pool Water" at www.finishing.com/149/95.shtml. The editor summarizes the post: "dozens of users found themselves able to easily get from brown rusty water to a sparkling clear pool with simple home built filters ranging from a couple of white socks to a pair of 5-gallon buckets with a small sump pump in one and the stuffing from a couple of old pillows in the other". An example is from Jun. 25, 2012, Jenna Bradford, from Alvada, Ohio, posted a device to fix the brown rusty water in their above-ground pool. The device is comprised of two five-gallon buckets, both buckets contain 1 and ½ inch holes drilled in the bottom, a working sump pump is placed in the first bucket with an additional hole in the top of the bucket for the hose, a pillow is placed in the second bucket and a hole is added for the other end of the hose to go thru.

Currently there are no portable pool filter systems designed for initial or excessive contamination clean up with a loose and replaceable filter completely contained within the same bucket as the pump.

Many above ground pools filter systems are not designed or able for initial filtering of high iron level or excessive contamination with a loose and replaceable filter completely contained within the same bucket as the pump.

SUMMARY

In a first aspect of the invention, a portable pool filter system comprising a bucket encasing a sump pump and a bag of filter material. The bucket includes a top, and the top defines at least one aperture for communication of water from the exterior of the bucket to the interior of the bucket. A bag of filter material is on top of the sump pump. Water is suction fed through the filter material before it enters the pump.

In an additional aspect of the invention, the bag of filter material is configured to be located in the interior of the bucket.

In another aspect of the invention, the bag of filter material is configured to decontaminate water from algae, iron, red clay, and oils.

In another aspect of the invention, the bag of filter material is easily disposable.

In one aspect of the invention, present invention is a complete portable and able to be used in any pool (above or below), spa, or hot tub.

In a further aspect of the invention, present invention filters at a much higher rate than standard above ground pools factory filter systems.

In a second aspect of the invention, the lid is modified so that a hose can be attached to an external pool vacuum or suction style pool skimmer.

In a third aspect of the invention, a portable pool filter system comprising a bucket encasing a sump pump and a bag of filter material. The bucket includes a top, and the bottom of the bucket defines at least one aperture for communication of water from the exterior of the bucket to the interior of the bucket. A bag of filter material is on beneath the sump pump. Water is suction fed through the filter material before it enters the pump.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein.

Figure 1:
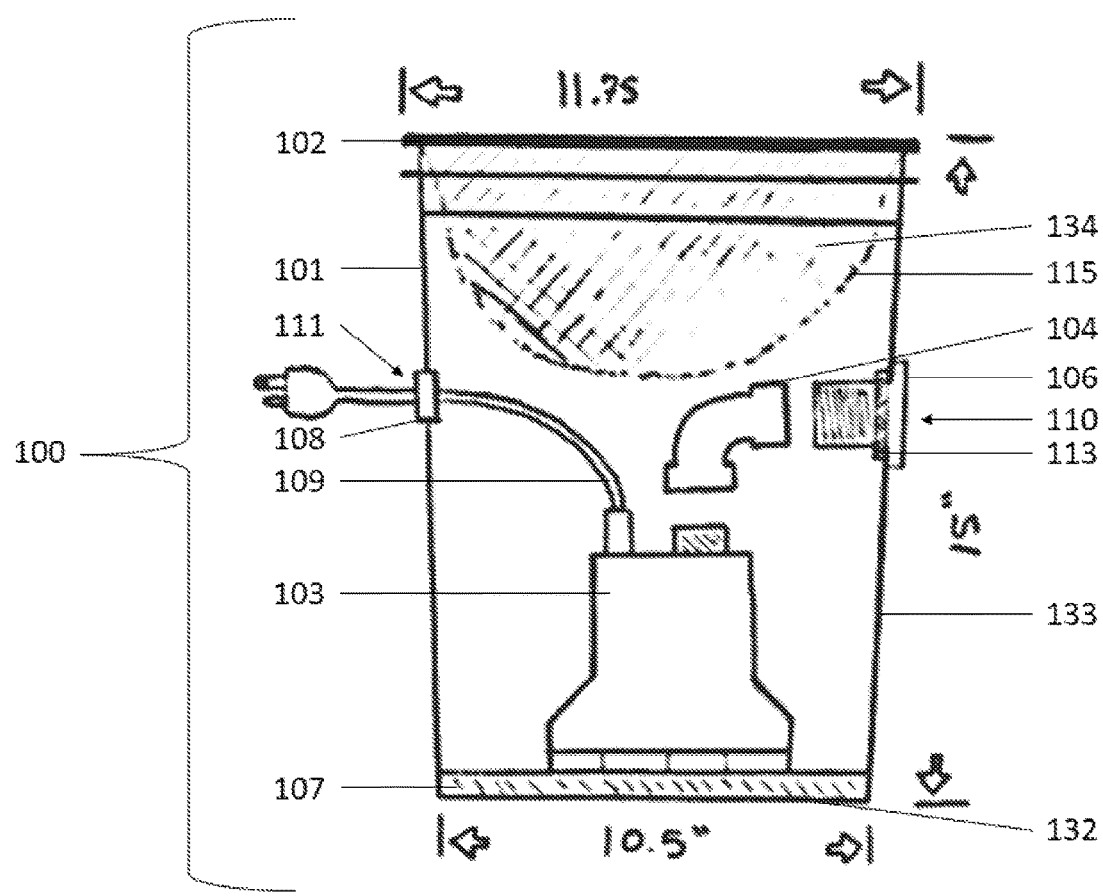
FIG. 1 illustrates an exemplary embodiment of the present disclosure of a portable pool filter system.

Corresponding reference characters indicate corresponding parts throughout the several views. Although the drawings represent embodiments of the present disclosure, the drawings are not necessarily to scale and certain features may be exaggerated in order to better illustrate and explain the present disclosure.

DETAILED DESCRIPTION OF THE EXEMPLARY EMBODIMENTS

The embodiments disclosed below are not intended to be exhaustive or limit the disclosure to the precise forms disclosed in the following detailed description. Rather, the embodiments are chosen and described so that others skilled in the art may utilize their teachings.

In the first embodiment as best illustrated in FIG. 1, the portable pool filter system 100 is comprised of a bucket 101 such as a standard US 5 gallon bucket, a bucket lid 102 such as a standard US 5 gallon bucket lid, a submersible utility pump 103, elbow connector 104 such as a 90 degree 1 inch NPT female×1 inch NPT female fitting, bulkhead fitting 106 such as a 1 inch double threaded bulkhead fitting, porous bag 115 and filter material 134, rubber grommet 108, and submersible utility pump power cord 109. Filter 107, such as a foam sponge, is upstream of submersible pump 103 and both are contained in bucket 101. A coupler such as 1 inch NPT male×1 inch NPT male fitting may be beneficial to connect other parts such as the elbow connector 104 to the bulkhead fitting 106.

Figure 2:
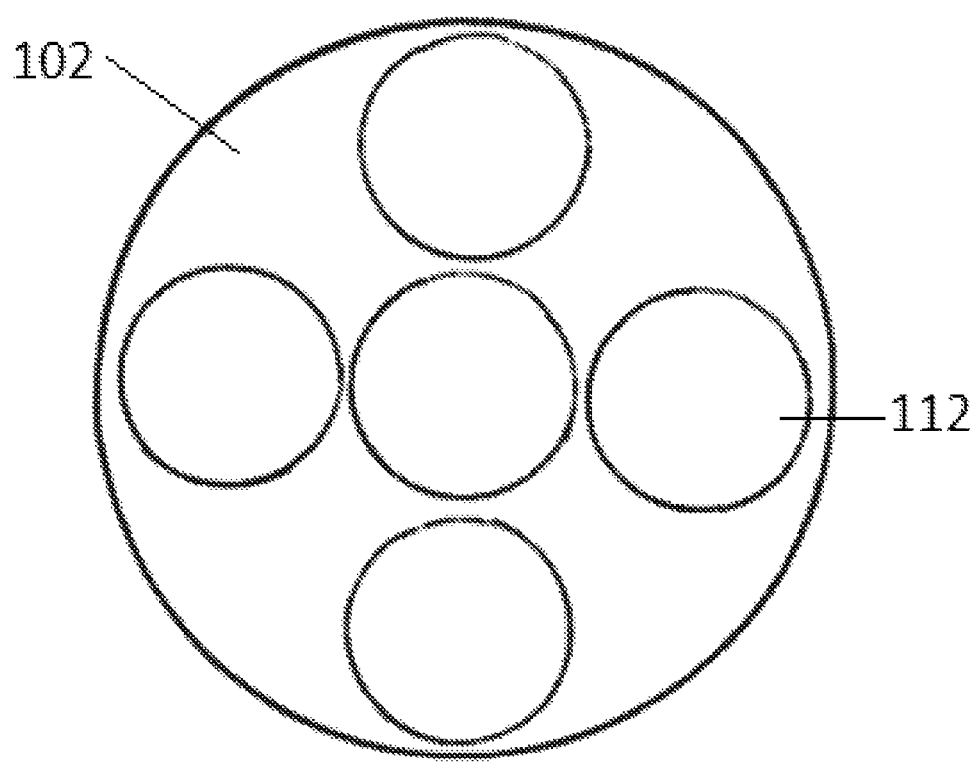
FIG. 2 illustrates the holes drilled into the lid of the bucket of the portable pool filter system.

As illustrated in FIG. 2, bucket lid 102 contains a plurality of holes 112 to permit entry of water into the portable pool filter system 100. Water enters portable pool filter system 100 via holes 112 in bucket lid 102 and the passes through a porous bag 115 filled with filter material 134. The bag 115 of filter material 134 is packed around submersible utility pump 103. Then the water passes through filter 107 before it enters submersible utility pump 103 and exits via fittings 104 and 106, and optionally 105. Pump power cord 109 passes through another hole in the side of bucket 101 that is fitted with rubber grommet 108.

Process for Constructing the Portable Pool Filter System

Step 1: Drill a first 1.5 inch water return hole 110 on sidewall 133 of bucket 101, approximately 9.25 inches above the deck 132 of the bucket 101.

Step 2: Drill a second 1" power cord hole 111; approximately 9.25 inches above the deck 132 of bucket 101 and approximately 5 inches to the right of the water return hole 110.

Step 3: Drill a plurality of 1" water entrance holes 112 in bucket lid 102 as shown in FIG. 2.

Step 3: Cut bulkhead fitting 106 to measure 1.5 inches in diameter circle. Bulkhead fitting may be placed at the bottom of bucket 101 until use in a later Step.

Step 4: Install the elbow connector 104 onto pump 103 as shown in FIG. 1.

Step 5: Place filter foam sponge 107 in the deck 132 of bucket 101.

Step 6: Place pump 103 into the center of the deck 132 of bucket 101 on top of filter 107.

Step 7: Route pump power cord 109 through the power cord hole 111.

Step 8: Route bulkhead fitting 106 through the water return hole 110 and screw onto open end of elbow connector 104.

Step 9: Secure bulkhead fitting 106 with lock nut 113.

Step 10: Route power cord 109 from Step 6 through grommet 108.

Step 11: Install grommet 108 into the power cord hole 111.

Step 12: Add filter material 134 to a porous bag 115 and install bag 115 with filter material 134 in the bucket 101.

Step 13: Install the bucket lid 102 onto bucket 101.

Construction of the exemplary portable pool filter system 100 is accomplished by performing steps 1 through 13.

Figure 3:
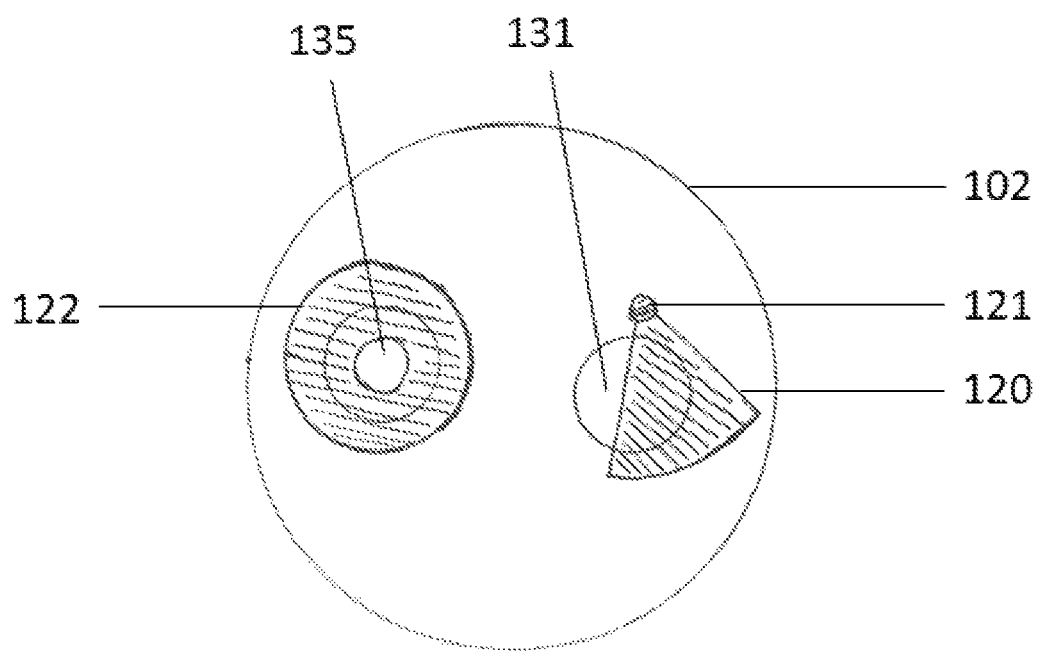
FIG. 3 illustrates a top view of the lid in a first alternative embodiment of the portable pool filter system.

As illustrated in FIG. 3, in the first alternative embodiment, bucket lid 102 contains a pair of holes 131 to permit passage of water into portable pool filter system 100. The first alternative embodiment is an accessory that replaces the lid. The accessory allows the user to vacuum the pool or attach a suction style pool skimmer. The accessory is used to filter contaminants on the pool bottom or surface.

Figure 4:
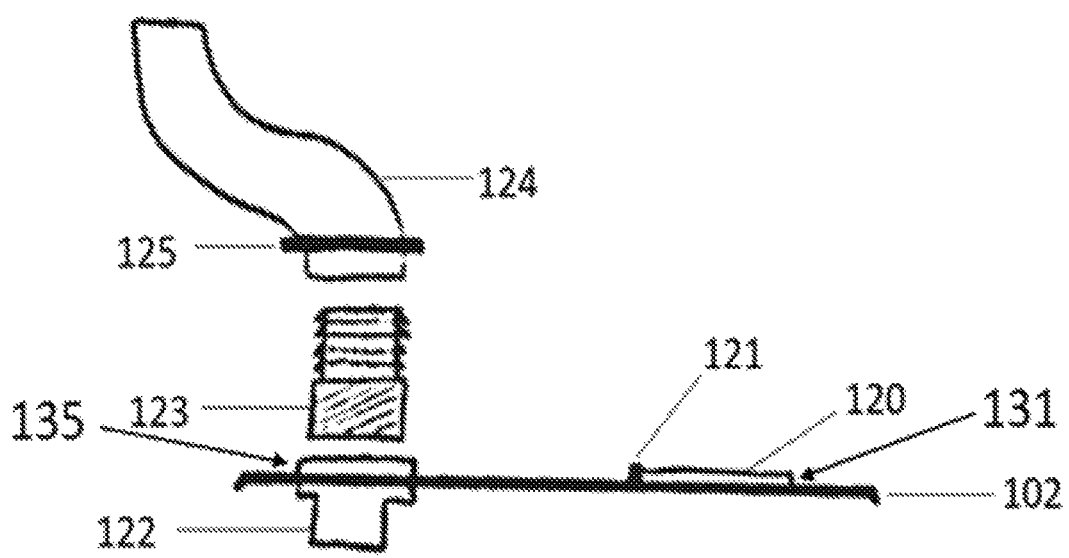
FIG. 4 illustrates a side partial cross-sectional view of the connections to the lid in the first alternative embodiment of the portable pool filter system.

As illustrated in FIGS. 3 and 4, in the first alternative embodiment, bulkhead fitting 122 is attached to the first hole 135. Barbed fitting 123 is attached to bulkhead fitting 122 on the inside of bucket lid 102. Hose 124 is attached to barbed fitting 123 and secured with clamp 125. Pressure regulator attachment fitting 121 is attached to the second hole 131. Pressure regulator 120 is attached to pressure regulator attachment fitting 121. Hose 124 is inserted into the bag 115 of filter material 134 surrounding submersible utility pump 103.

Process for Constructing the First Alternative Embodiment of Portable Pool Filter System Step 1A: Drill a first hole 135 into bucket lid 102 of appropriate size to accommodate bulkhead fitting 122.

Step 2A: Drill a second hole 131 into bucket lid 102 of appropriate size to accommodate pressure regulator attachment fitting 121 and pressure regulator 120.

Step 3A: Attach bulkhead fitting 122 to the first hole 131 in bucket lid 102.

Step 4A: Insert pressure regulator fitting 121 into second hole 131 and attach pressure regulator 120 to pressure regulator fitting 121.

Step 5A: Attach hose 124 to barbed fitting 123 and secure with clamp 125. Attach barbed fitting 123 to bulkhead fitting 122.

Steps 6-12 are the same as the exemplary embodiment.

Construction of the first alternative embodiment of the portable pool filter system is accomplished by performing steps 1A through 5A, and 6-12.

First Example

Filter excessive contaminants if pool, spa, or hot tub gets excessively dirty from over usage or weather.

Second Example

Filter excessive levels of iron after filling a pool, spa, or hot tub after initial fill.

Third Example

The Accessory, in the first alternative embodiment, allows for pools otherwise not equipped with a filter the ability to filter contaminations on pool bottom or surface.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A portable device for decontaminating pool water comprising a bucket encasing a sump pump and a bag of filter material,
   wherein the bucket includes a top,
   wherein the top defines at least one aperture for communication of water from the exterior of the bucket to the interior of the bucket,
   wherein the bag of filter material is completely contained within the bucket and adjacent to the sump pump,
   wherein the bag is filled with the filter material,
   wherein the filter material includes a foam sponge or pillow stuffing, wherein the filter material is configured to decontaminate the pool water from algae, iron, red clay, and oils, and
   wherein water is suction fed through the filter material before it enters the pump.

2. The device of claim 1, wherein the bag of titter material is easily disposable.

3. The device of claim 1, wherein the top further comprising a bulkhead fitting, a pressure regulator, a pressure regulator attachment fitting, a hose, a barbed fitting, and a clamp,
   wherein the top includes a first hole and a second hole,
   wherein the bulk head fitting is attached to the first hole,
   wherein the pressure regulator attachment fitting is attached to the second hole and to the pressure regulator, and
   wherein the barbed fitting is attached to the hose and secured with the clamp on one end and attached to the bulkhead fitting on the other end.

* * * * *